United States Patent
Chiang

(10) Patent No.: US 6,679,148 B2
(45) Date of Patent: Jan. 20, 2004

(54) BELT SAW MACHINE WITH A ROTATABLE CUTTER SHIELD

(76) Inventor: Pei-Lieh Chiang, No. 12, Nan-Ping Rd., Nan Dist., Taichung City (TW)

( * ) Notice: Subject to any disclaimer, the term of this patent is extended or adjusted under 35 U.S.C. 154(b) by 0 days.

(21) Appl. No.: 10/301,255

(22) Filed: Nov. 21, 2002

(65) Prior Publication Data

US 2003/0233924 A1 Dec. 25, 2003

(30) Foreign Application Priority Data

Jun. 21, 2002 (TW) ...................................... 91209380 U

(51) Int. Cl.$^7$ ................................................ B26D 1/54
(52) U.S. Cl. .............................. 83/788; 83/820; 83/812
(58) Field of Search ........................ 83/788, 820, 812; 452/160

(56) References Cited

U.S. PATENT DOCUMENTS

| | | | | |
|---|---|---|---|---|
| 4,321,849 A | * | 3/1982 | Athey et al. | 83/788 X |
| 4,920,846 A | * | 5/1990 | Duginske et al. | 83/820 |
| 5,041,056 A | * | 8/1991 | Hutton | 83/788 X |
| 6,240,825 B1 | * | 6/2001 | Xie | 83/820 |
| 6,457,395 B1 | * | 10/2002 | Wiand et al. | 83/820 |

* cited by examiner

Primary Examiner—Charles Goodman
(74) Attorney, Agent, or Firm—Trop, Pruner & Hu, P.C.

(57) ABSTRACT

A belt saw machine includes a machine base, a support frame unit, a worktable, a cutter unit, a workpiece positioning unit, and a cutter shield device. The support frame unit includes a fixed cover and a rotatable cover connected pivotally to the fixed cover. The cutter unit includes a drive roller unit and a belt cutter. The workpiece positioning unit is mounted on the fixed cover. The cutter shield device includes a shield shaft fixed on the workpiece positioning unit, and a shield assembly mounted on the shield shaft and pivotable thereabout. The shield assembly includes an angled shield plate that is rotatable to a shielding position for covering the belt cutter when the rotatable cover is disposed at a covering position, and to a non-shielding position when the rotatable cover is disposed at an open position, thereby permitting replacement of the belt cutter.

4 Claims, 8 Drawing Sheets

120
BELT SAW MACHINE WITH A ROTATABLE CUTTER SHIELD

CROSS-REFERENCE TO RELATED APPLICATION

This application claims priority of Taiwanese application no. 091209380, filed on Jun. 21, 2002.

BACKGROUND OF THE INVENTION

1. Field of the Invention

The invention relates to a belt saw machine, more particularly to a belt saw machine with a rotatable cutter shield that can facilitate replacement of a belt cutter.

2. Description of the Related Art

Referring to FIGS. 1 and 2, a conventional belt saw machine 10 is shown to include a machine base 11 adapted to stand on a ground, a support frame unit 12 mounted on the machine base 11, a drive roller unit 13 mounted in the support frame unit 12, a belt cutter 14 trained on the drive roller unit 13, a workpiece positioning unit 15 mounted on the support frame unit 12 and movable vertically, and a cutter shield device 16 mounted on the support frame unit 12 for shielding the belt cutter 14. The belt saw machine 10 further includes a worktable 111 mounted horizontally on the machine base 11 and disposed in a notch 121 of the support frame unit 12. The drive roller unit 13 includes a motor 131 mounted fixedly on the support frame unit 12, a lower drive roller 132 mounted rotatably to the support frame unit 12 and driven by the motor 131, and an upper drive roller 133 mounted rotatably to the support frame unit 12. The belt cutter 14 is trained on the upper and lower drive rollers 133, 132, and extends through the worktable 111 in the notch 121. The workpiece positioning unit 15 includes a mounting block 151 secured to the support frame unit 12, a vertical rack 152 disposed between the mounting block 151 and the support frame unit 12, a rotatable adjusting rod 153 extending through the mounting block 151 in a direction transverse to the rack 152, a drive pinion 154 sleeved fixedly on the adjusting rod 153 for driving the rack 152, and a positioning block 155 mounted fixedly on a lower end of the rack 152. The cutter shield device 16 includes an angled shield plate 162 that is formed with a plurality of slots 1621, and a plurality of fasteners 161 that fasten a lower end of the shield plate 162 to the positioning block 155 through the slots 1621. When the fasteners 161 are tightly screwed, the shield plate 162 will be in a position for shielding the belt cutter 14. In use, the adjusting rod 153 is rotated to drive the rack 152 for moving the positioning block 155 downwardly until the latter presses a workpiece (not shown) against the worktable 111 for positioning the same. Thereafter, the motor 131 can be activated to drive the belt cutter 14 for cutting the workpiece. The cutter shield device 16 shields the belt cutter 14 for work safety. In practice, the conventional belt saw machine 10 suffers from the following drawbacks:

When replacing the belt cutter 14, since the shield plate 162 shields the belt cutter 14, the shield plate 162 must be dismantled, which requires unscrewing of the fasteners 161. Moreover, after replacing the belt cutter 14, the shield plate 162 has to be mounted once again on the positioning block 155 by tightly screwing the fasteners 161 through the slots 1621. Therefore, quick replacement of the belt cutter 14 is not possible in the conventional belt saw machine 10.

SUMMARY OF THE INVENTION

Therefore, the object of the present invention is to provide a belt saw machine with a rotatable cutter shield that can facilitate replacement of a belt cutter.

Accordingly, a belt saw machine of this invention comprises:

a machine base adapted to stand on a ground;

a support frame unit including a fixed cover mounted fixedly on the machine base, and a rotatable cover connected pivotally to the fixed cover and rotatable between a covering position and an open position;

a worktable mounted horizontally on the machine base and adapted to support the workpiece thereon;

a cutter unit including an upper drive roller mounted rotatably to the fixed cover, a lower drive roller mounted rotatably to an assembly of the machine base and the fixed cover, a motor mounted on the assembly of the machine base and the fixed cover for driving the lower drive roller, and an endless belt cutter trained on the upper and lower drive rollers and having a portion that extends through a space which is defined between the fixed cover and the rotatable cover when the rotatable cover is disposed at the covering position;

a workpiece positioning unit mounted on the fixed cover and disposed above the worktable, the workpiece positioning unit including a positioning block that is connected vertically and movably to the fixed cover and that is movable downwardly relative to the worktable so as to be adapted to press the workpiece against the worktable; and a cutter shield device including
a vertical shield shaft having a lower end fixed on the positioning block, and
a shield assembly mounted on the shield shaft and pivotable thereabout, the shield assembly including an angled shield plate and a sleeve connected fixedly to the shield plate and sleeved rotatably on the shield shaft, the shield plate being confined between the fixed cover and the rotatable cover and having a lower portion projecting downwardly from the fixed cover and the rotatable cover for covering the belt cutter when the rotatable cover is disposed at the covering position, the shield plate being rotatable to a non-shielding position when the rotatable cover is disposed at the open position, thereby permitting replacement of the belt cutter.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
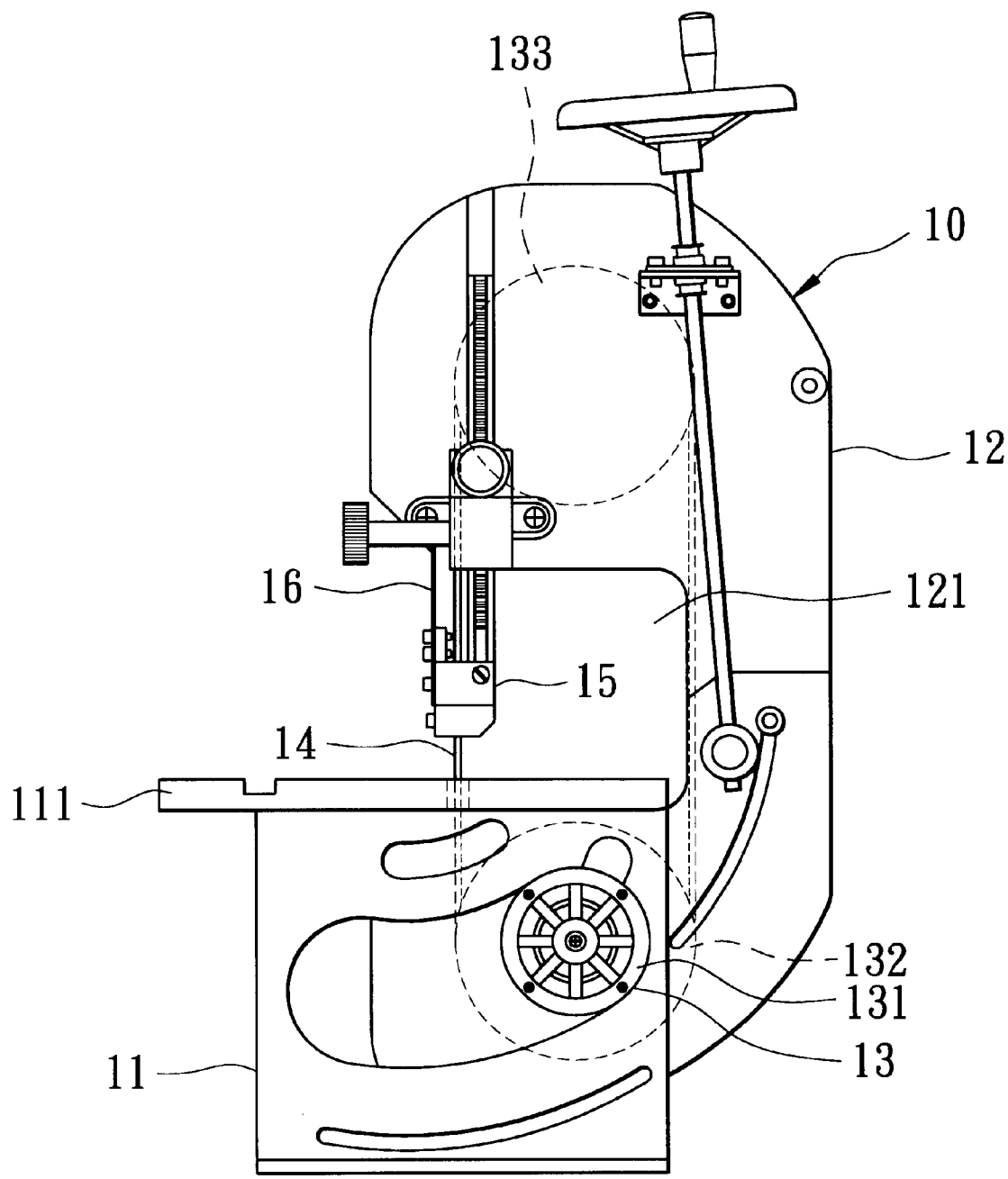
FIG. 1 is a schematic rear view of a conventional belt saw machine.
Figure 2:
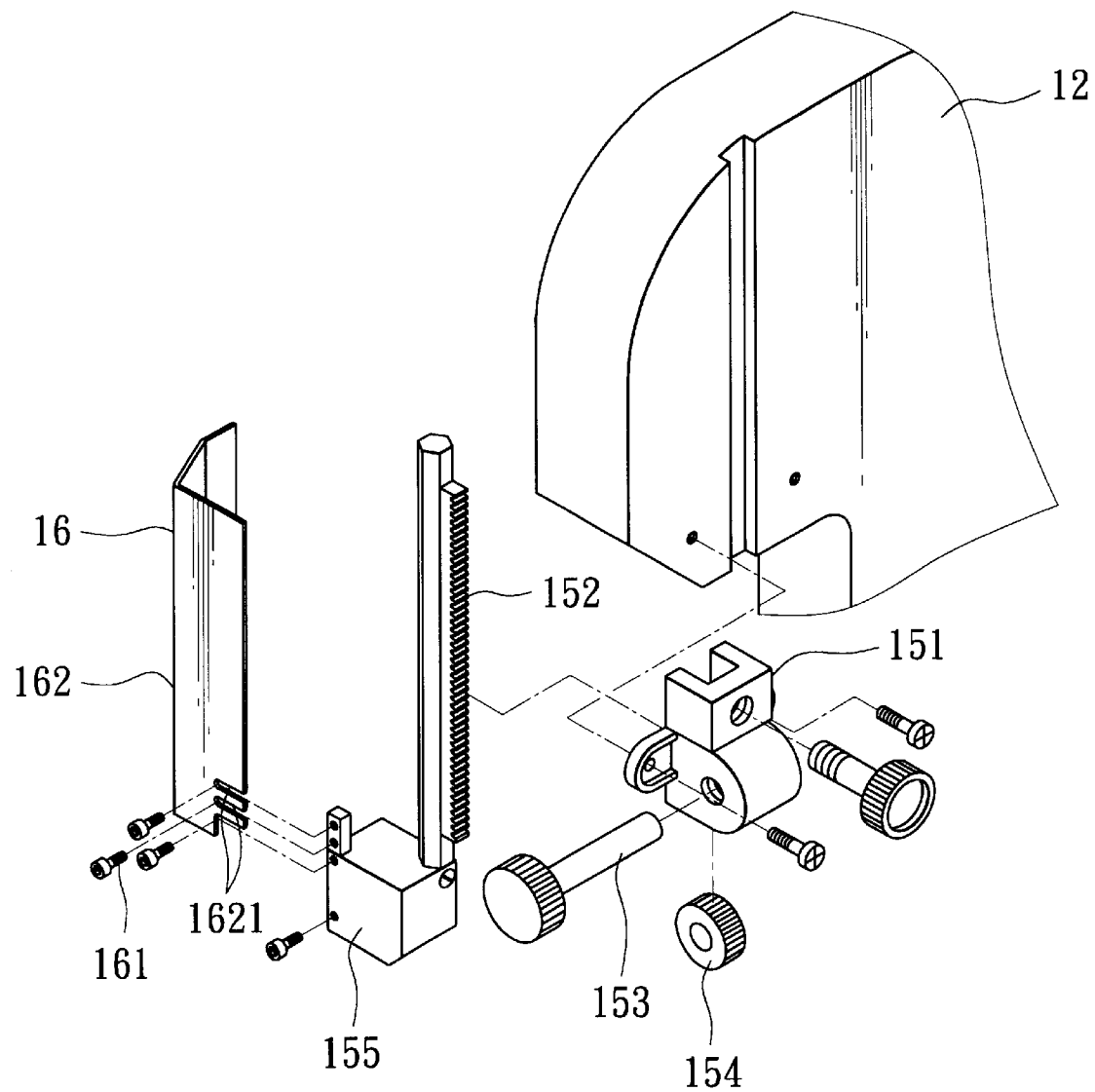
FIG. 2 is a fragmentary exploded perspective view illustrating a workpiece positioning unit and a cutter shield device of the conventional belt saw machine.
Figure 3:
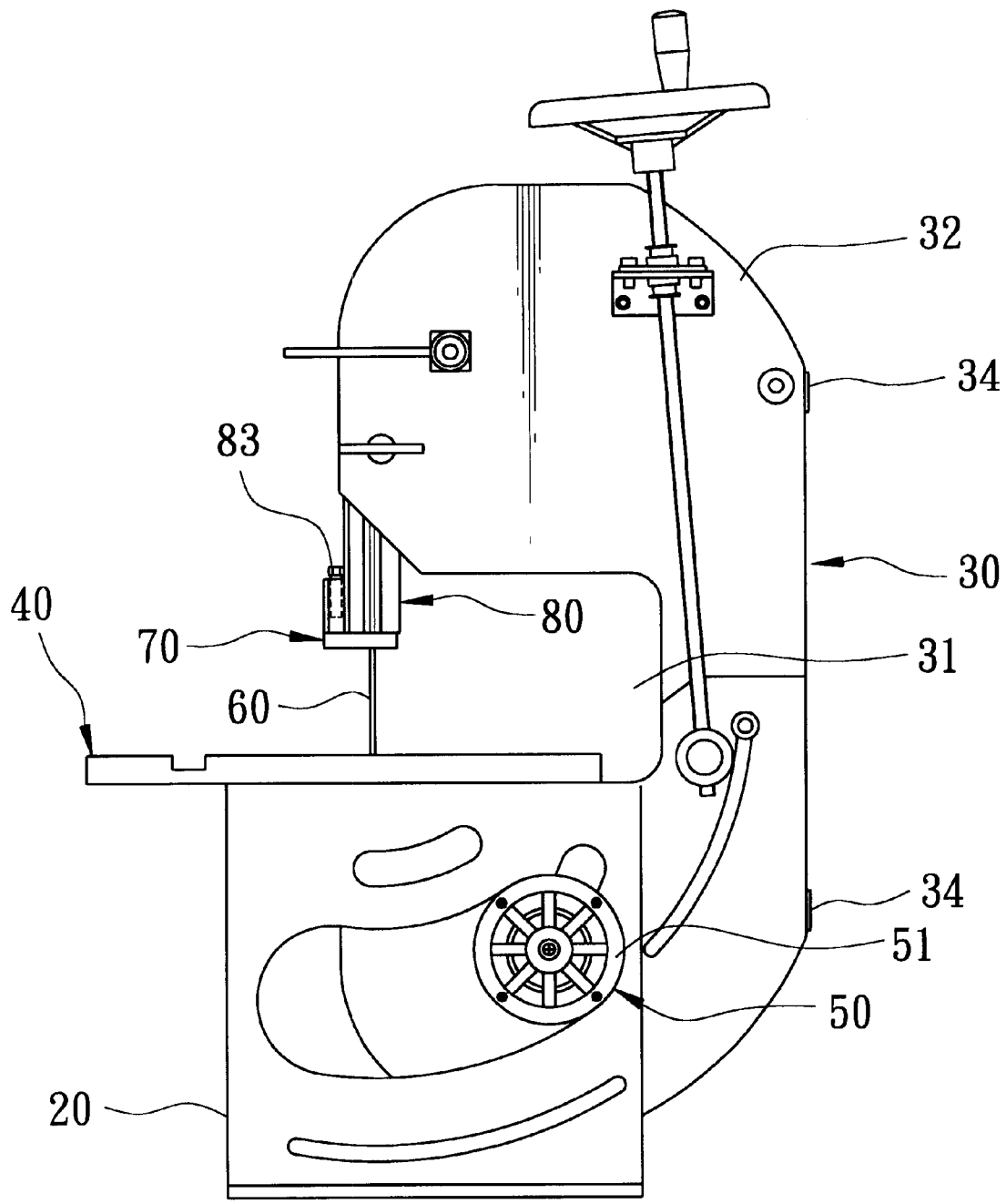
FIG. 3 is a schematic rear view of a preferred embodiment of a belt saw machine according to the present invention.
Figure 4:
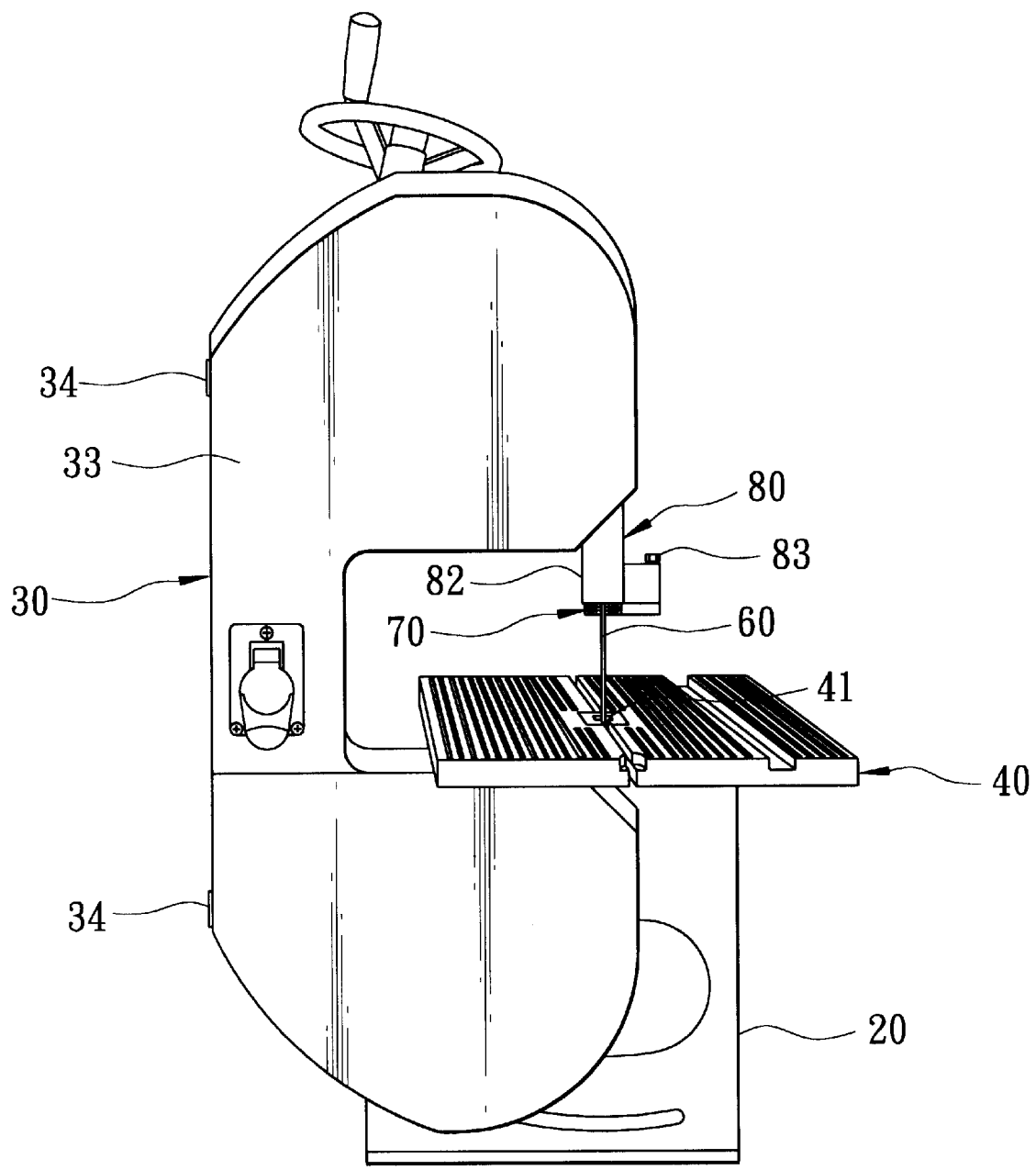
FIG. 4 is a schematic front view of the preferred embodiment of a belt saw machine according to the present invention.
Figure 5:
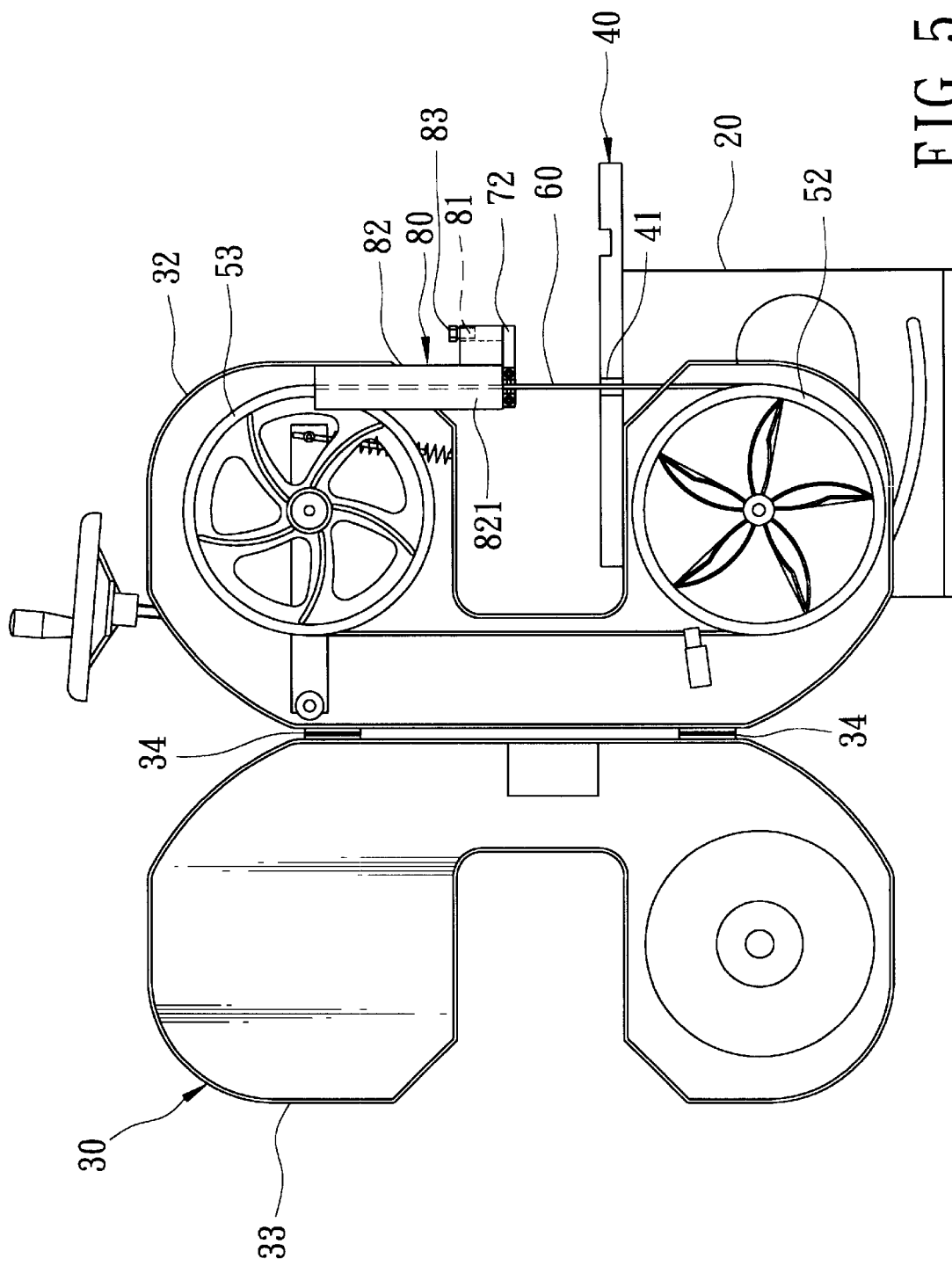
FIG. 5 is a schematic front view of the preferred embodiment to illustrate a rotatable cover at an open position and a shield plate at a shielding position for shielding a belt cutter.

Referring to FIGS. 3, 4 and 5, the preferred embodiment of a belt saw machine according to the present invention is shown to include a machine base 20 adapted to stand on a ground, a support frame unit 30 mounted on the machine base 20, a worktable 40 mounted on the machine base 20, a drive roller unit 50 mounted in the support frame unit 30, a belt cutter 60 trained on the drive roller unit 50, a workpiece positioning unit 70 mounted on the support frame unit 30 and movable vertically, and a cutter shield device 80 mounted on the workpiece positioning unit 70 for shielding the belt cutter 60.

The support frame unit 30 is generally C-shaped and has a notch 31 formed in a central part thereof. The support frame unit 30 includes a fixed cover 32 mounted fixedly on the machine base 20, and a rotatable cover 33 connected pivotally to the fixed cover 32 through a set of hinges 34. The rotatable cover 33 is rotatable relative to the fixed cover 32 between a covering position (see FIG. 4) and an open position (see FIG. 5).

The worktable 40 is mounted horizontally on top of the machine base 20, is disposed in the notch 31 of the support frame unit 30, and is adapted to support a workpiece (not shown) thereon. The worktable 40 is further formed with a through hole 41.

The drive roller unit 50 includes an upper drive roller 53 mounted rotatably to the fixed cover 32 and disposed above the worktable 40, a lower drive roller 52 mounted rotatably to the fixed cover 32 and disposed below the worktable 40, and a motor 51 mounted on the machine base 20 for driving the lower drive roller 52.

The belt cutter 60 is trained on the upper and lower drive rollers 52, 53 and passes through the through hole 41 in the worktable 40. A portion of the belt cutter 60 extends through a space which is defined between the fixed cover 32 and the rotatable cover 33 when the rotatable cover 33 is disposed at the covering position.

Figure 6:
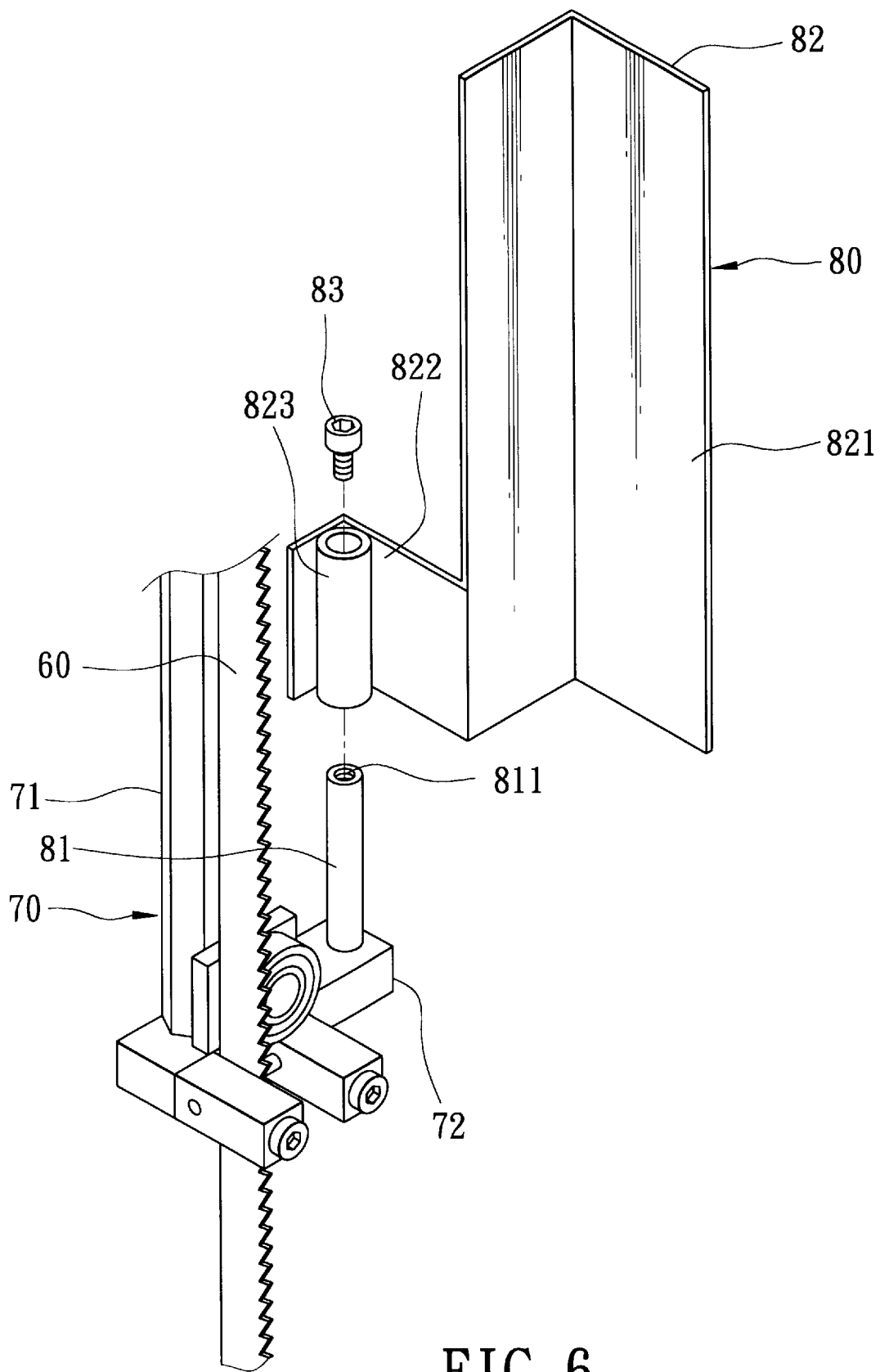
FIG. 6 is a fragmentary exploded perspective view illustrating a cutter shield device of the preferred embodiment.
Figure 7:
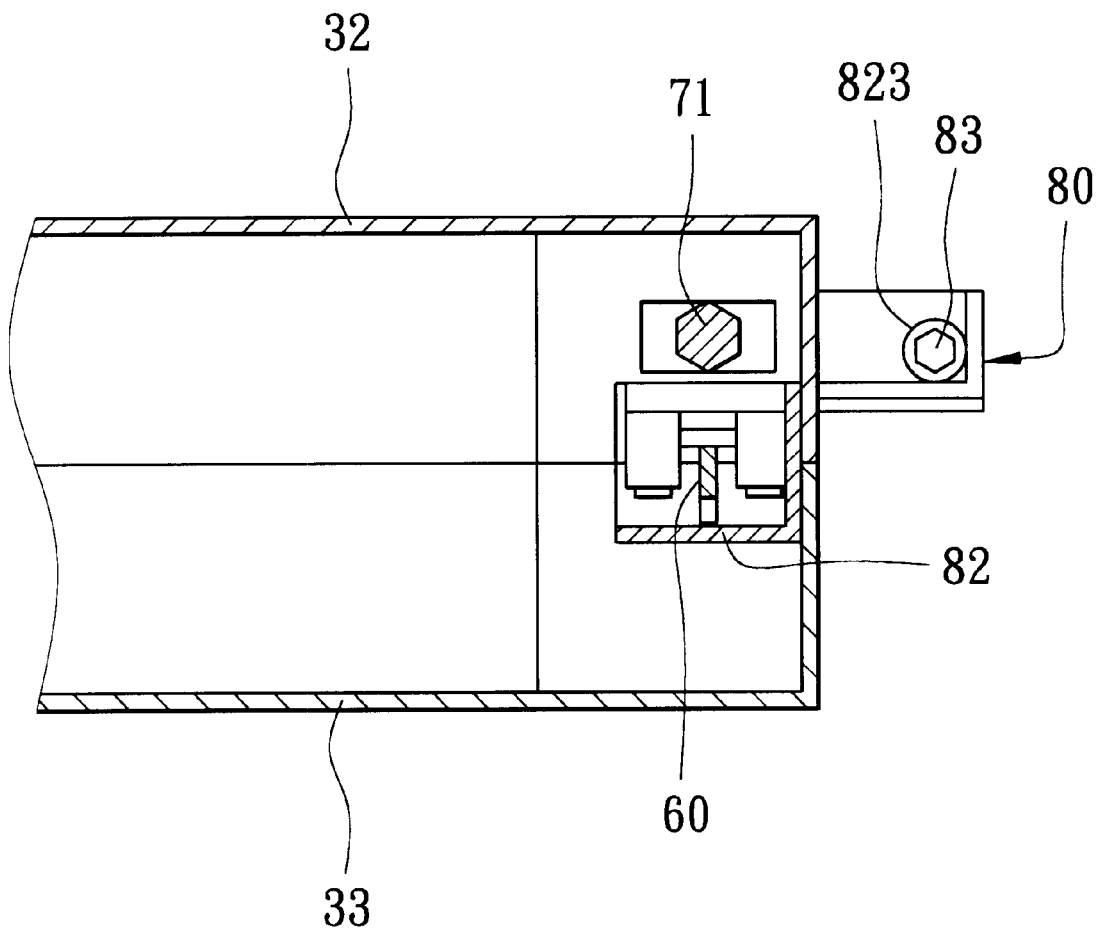
FIG. 7 is a fragmentary top sectional view of the preferred embodiment to illustrate the rotatable cover at a covering position and the shield plate at the shielding position for shielding the belt cutter.

With reference to FIGS. 5 and 6, the workpiece positioning unit 70 is mounted on the fixed cover 32 and is disposed above the worktable 40. The workpiece positioning unit 70 includes a hoisting rod 71 and a positioning block 72. The hoisting rod 71 is connected vertically and movably to the fixed cover 32 in a known manner, and is thus movable downwardly relative to the worktable 40. The positioning block 72 is mounted at a lower end of the hoisting rod 71 and is movable therewith so as to be adapted to press the workpiece against the worktable 40.

The cutter shield device 80 includes a vertical shield shaft 81 and a shield assembly 82. The shield shaft 81 has a lower end fixed on the positioning block 72. The shield assembly 82 is mounted on the shield shaft 81 and is pivotable thereabout. The shield assembly 82 includes an angled shield plate 821, a connecting plate 822 extending transversely from a lateral edge of the shield plate 821, and a sleeve 823 connected fixedly to the connecting plate 822 and sleeved rotatably on the shield shaft 81. The shield plate 821 has two vertical plate portions, which have adjacent vertical sides respectively, that are formed integrally with each other and that are perpendicular to each other.

In this embodiment, the shield shaft 81 has an upper surface that is formed with a threaded hole 811, and is longer than the sleeve 823. The sleeve 823 has an upper end surface. The cutter shield device 80 further includes a bolt 83 that engages the threaded hole 811 and that has a head which abuts against the upper end surface of the sleeve 823 for arresting upward movement of the sleeve 823 relative to the shield shaft 81.

Referring to FIGS. 4 to 7, the fixed cover 32 and the rotatable cover 33 define a rectangular space therebetweeen, within which the shield plate 821 is received, thereby preventing movement of the shield plate 821 relative to the fixed cover 32 and the rotatable cover 33 when the rotatable cover 33 is disposed at the covering position. When the shield plate 821 is confined between the fixed cover 32 and the rotatable cover 33, a lower portion of the shield plate 821 projects downwardly from the fixed cover 32 and the rotatable cover 33 for covering the belt cutter 60 to ensure work safety.

Figure 8:
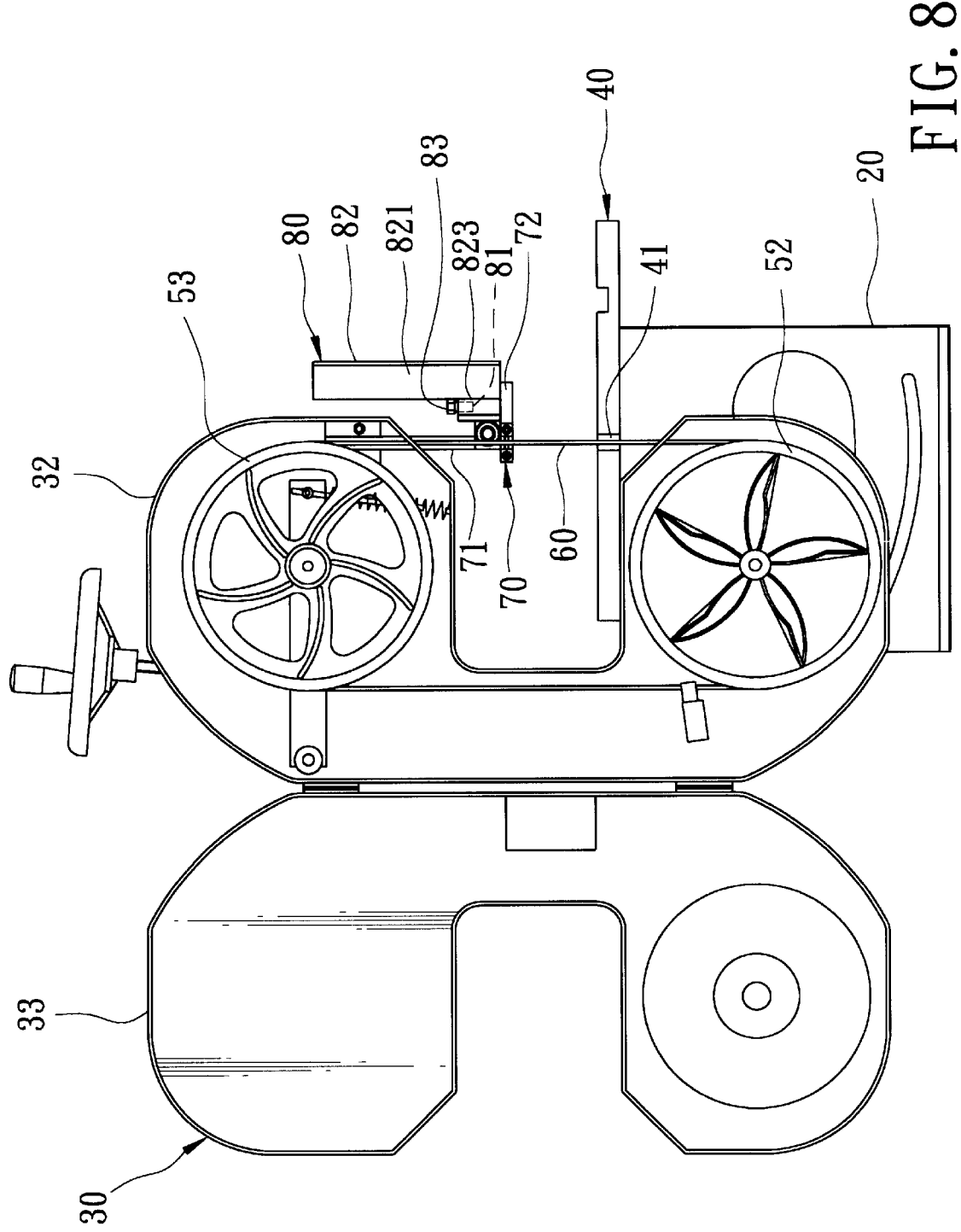
FIG. 8 is a view similar to FIG. 5, wherein the rotatable cover is at the open position and the shield plate is at a non-shielding position to permit replacement of the belt cutter.

Referring to FIGS. 5, 6, and 8, when replacing the belt cutter 60, the rotatable cover 33 is first rotated to the open position, and the shield plate 821 is then rotated to a non-shielding position by pivoting the sleeve 823 about the shield shaft 81. At this time, the old belt cutter 60 can be dismantled, and a new belt cutter 60 can be trained between the upper drive roller 53 and the lower drive roller 52. The shield plate 821 is subsequently rotated to shield the new belt cutter 60, and the rotatable cover 33 is thereafter rotated to the covering position so as to complete the belt cutter replacement operation.

The shield plate 821 of the cutter shield device 80 in the belt saw machine of this invention is pivotable in design. Therefore, by a simple pivoting action, the shield plate 821 can be pivoted to the non-shielding position for replacement of the belt cutter 60. On the other hand, by another pivoting action, the shield plate 821 can be pivoted to the shielding position, and the rotatable cover 33 can be thereafter disposed at the covering position for confining the shield plate 821 to the shielding position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A belt saw machine adapted for working on a workpiece, comprising:

a machine base adapted to stand on a ground;

a support frame unit including a fixed cover mounted fixedly on said machine base, and a rotatable cover connected pivotally to said fixed cover and rotatable between a covering position and an open position;

a worktable mounted horizontally on said machine base and adapted to support the workpiece thereon;

a cutter unit including an upper drive roller mounted rotatably to said fixed cover, a lower drive roller mounted rotatably to an assembly of said machine base and said fixed cover, a motor mounted on the assembly of said machine base and said fixed cover for driving said lower drive roller, and an endless belt cutter trained on said upper and lower drive rollers and having a portion that extends through a space which is defined between said fixed cover and said rotatable cover when said rotatable cover is disposed at said covering position;

a workpiece positioning unit mounted on said fixed cover and disposed above said worktable, said workpiece positioning unit including a positioning block that is connected vertically and movably to said fixed cover and that is movable downwardly relative to said worktable so as to be adapted to press the workpiece against said worktable; and a cutter shield device including
- a vertical shield shaft having a lower end fixed on said positioning block, and
- a shield assembly mounted on said shield shaft and pivotable thereabout, said shield assembly including an angled shield plate and a sleeve connected fixedly to said shield plate and sleeved rotatably on said shield shaft, said shield plate being confined between said fixed cover and said rotatable cover and having a lower portion projecting downwardly from said fixed cover and said rotatable cover for covering said belt cutter when said rotatable cover is disposed at said covering position, said shield plate being rotatable to a non-shielding position when said rotatable cover is disposed at said open position, thereby permitting replacement of said belt cutter.

2. The belt saw machine as claimed in claim 1, wherein said shield shaft has an upper surface that is formed with a threaded hole, and is longer than said sleeve, said sleeve having an upper end surface, said cutter shield device further including a bolt that engages said threaded hole and that has a head which abuts against said upper end surface of said sleeve for arresting upward movement of said sleeve relative to said shield shaft.

3. The belt saw machine as claimed in claim 1, wherein said shield plate has two vertical plate portions, which have adjacent vertical sides respectively, that are formed integrally with each other and that are perpendicular to each other.

4. The belt saw machine as claimed in claim 3, wherein said fixed cover and said rotatable cover define a rectangular space therebetweeen, within which said shield plate is received, thereby preventing movement of said shield plate relative to said fixed cover and said rotatable cover when said rotatable cover is disposed at said covering position.

* * * * *